US012645550B1

(12) United States Patent
Kumar et al.

(10) Patent No.: US 12,645,550 B1
(45) Date of Patent: Jun. 2, 2026

(54) IDENTIFYING DELETED KEYS DURING SNAPSHOT COMPARISONS

(71) Applicant: Cohesity, Inc., San Jose, CA (US)

(72) Inventors: Anirudh Kumar, San Jose, CA (US); Namit Sharma, San Jose, CA (US); Avinash Nath Aita, San Jose, CA (US); Samanvitha Reddy Panyam, Sunnyvale, CA (US)

(73) Assignee: Cohesity, Inc., Santa Clara, CA (US)

( * ) Notice: Subject to any disclaimer, the term of this patent is extended or adjusted under 35 U.S.C. 154(b) by 65 days.

(21) Appl. No.: 18/428,551

(22) Filed: Jan. 31, 2024

(51) Int. Cl.
| | |
|---|---|
| *G06F 11/00* | (2006.01) |
| *G06F 11/1446* | (2026.01) |
| *G06F 11/1471* | (2026.01) |
| *G06F 16/22* | (2019.01) |

(52) U.S. Cl.
CPC ...... *G06F 11/1471* (2013.01); *G06F 11/1469* (2013.01); *G06F 16/2246* (2019.01); *G06F 2201/80* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 10,540,236 B2 | 1/2020 | Mutalik et al. | |
| 12,332,912 B2 * | 6/2025 | Thomsen | G06F 16/27 |
| 2021/0263802 A1 | 8/2021 | Gottemukkula et al. | |
| 2022/0138207 A1 * | 5/2022 | Yelheri | G06F 11/2094 |
| | | | 707/722 |
| 2023/0195578 A1 | 6/2023 | Lee | |

OTHER PUBLICATIONS

Cohesity, "Cohesity SnapTree", 2016, 2 pp., URL: https://www.cohesity.com/resource-assets/solution-brief/Cohesity-SnapTree-Solution-Brief.pdf.

He et al., "Clone-based Data Index in Cloud Storage Systems", MATEC Web of Conferences, vol. 63, EDP Sciences, Jul. 12, 2016, 6 pp.

Loyalflow et al., "Comparing 2 b-tree's to see if they contain the same values", Stack overflow, Jan. 31, 2013, 3 pp., URL: https://stackoverflow.com/questions/14628582/comparing-2-b-trees-to-see-if-they-contain-the-same-values.

Rodeh, "IBM Research Report: B-trees, Shadowing, and Clones", Research Division, IBM, Nov. 12, 2006, 15 pp.

* cited by examiner

*Primary Examiner* — Midys Rojas
(74) *Attorney, Agent, or Firm* — Shumaker & Sieffert, P.A.

(57) ABSTRACT

Techniques are described for identifying deleted keys during snapshot comparisons managed by a data platform. A computing system that implements the data platform comprising a memory and processing circuitry may be configured to perform the techniques. The memory may store metadata identifying, at least in part, one or more deleted keys representative of deleted data that has been deleted from a storage system. The processing circuitry may identify a first tree data structure corresponding to a first snapshot of the storage system at a first time, and identify a second tree data structure corresponding to a second snapshot of the storage system at a second later time. The processing circuitry may traverse the first tree data structure and second tree data structures to identify the one or more deleted keys, and perform, based on the deleted keys, a data protection operation.

20 Claims, 4 Drawing Sheets

IDENTIFYING DELETED KEYS DURING SNAPSHOT COMPARISONS

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

A file system snapshot is a point-in-time copy or representation of the entire file system or a specific subset of it. A snapshot captures the state of files and directories at a particular moment, providing a snapshot of the file system's data as it existed at that specific point. File system snapshots are often used for backup and recovery purposes and can offer benefits in terms of data protection and system consistency. The file system data can include file system's objects (e.g., files, directories), metadata, or both.

SUMMARY

Aspects of this disclosure describe techniques for efficient identification of deleted keys representative of data stored to at least a portion of a storage system when comparing two snapshots of the at least the portion of the storage system. Snapshots are typically maintained using a tree data structure (e.g., a B plus tree data structure) in which changes or updates are reflected as linked tree data structures in which a node of a first tree data structure is referenced by a node of a second tree data structure. These linked tree data structures are commonly linked between a root node of the first tree data structure and a root node of a second subsequent tree data structure in which any nodes of the second subsequent tree data structure identify any changes to the linked first tree data structure. Traversing the linked tree data structures may enable restoration of any of the snapshots represented by the linked tree data structures (which may occur over time, such as hours, days, weeks, months, etc.), enabling data reconstruction at various points in time (e.g., at all available snapshot times) to facilitate data recovery.

In some instances, these linked tree data structures may reference nodes across the linked tree data structures other than the root node. As an example, a root node of the second subsequent linked tree data structure may reference a child node to the root node of the first linked tree data structure. Traversing each of the first linked tree data structure and the second subsequent tree data structure may enable a data platform to reconstruct at least the portion of the storage system at an identified snapshot time, while also reducing overhead in terms of first reconstructing each individual snapshot preceding the snapshot requested for reconstruction (where such overhead may refer to computing resources, such as processing cycles, memory, memory bus bandwidth, etc., and associated power consumption).

Optimization to a difference (which is another way to refer to a comparison) operation between any two snapshots may allow for various keys of the linked tree data structures to be identified as updated (meaning, the underlying data has been updated—or in other words, changed—but not deleted or newly created). In this disclosure, keys may be linked to leaf nodes of the linked tree data structure and represent data stored to at least the portion of the storage system undergoing the snapshot data protection operation. However, often such data platforms may rely on different mechanisms to identify deleted keys between two different snapshots represented by two or more of the tree data structures in the linked tree data structure. As one example, the data platform may perform deleted key detection at the file-system level, which may be inefficient (in terms of the computing resources noted above) and delay transfer of data for other data protection operations (such as replication and/or archiving in which the snapshots are used to capture updates to the data over time that require replication and/or archiving).

In accordance with various aspects of the techniques described in this disclosure, the data platform may perform the snapshot comparison by leveraging the linked tree data structures to identify deleted keys. Rather than rely on file system-level operations to identify deleted keys, the data platform may traverse each of two tree data structures of the linked tree data structure (in synchronization) to identify deleted keys. The data platform may traverse each of a first tree data structure and a second tree data structure in a synchronized fashion, performing the same depth first search (DFS) with respect to each of the first and second tree data structures. Prior to performing DFS, the data platform may initialize a first iterator that tracks traversal of the first tree data structure during the first DFS, and a second iterator that tracks traversal of the second tree data structure during the second DFS.

Based on the first iterator and the second iterator, the data platform may identify which of one or more first keys linked in the first tree data structure have been deleted and are no longer present in one or more keys linked in the second subsequent tree data structure. That is, when the one or more keys linked to a first node (as identified by the first iterator) of the first tree data structure is greater than the one or more keys linked to a second node (as identified by the second iterator) of the second tree data structure, the data platform may determine that the one or more first keys include one or more deleted keys representative of deleted data that has been deleted from the at least the portion of the storage system between a first time of the first snapshot and a second time of the second subsequent snapshot.

The data platform may iteratively compare each one of the one or more first keys to a corresponding one of the one or more second keys during traversal of the one or more first keys and the one or more second keys. As noted above, this traversal occurs synchronously, where traversing each of the one or more first keys and the one or more second keys occurs according to the traversal algorithm, such as DFS. If the one of the one or more first keys ("key1") is less than the corresponding one of the one or more second keys ("key2"), the data platform advances the first iterator and outputs key1 as a deleted key. This traversal and comparison occurs for all nodes in the first tree data structure and the second tree data structure that store keys. In this respect, various aspects of the techniques may enable data platforms to perform a full snapshot comparison that detects deleted keys (representative of corresponding deleted data no longer stored to the at least the portion of the storage system), potentially without having to rely on underlying file system-level tracking or other mechanisms.

The techniques of this disclosure may provide one or more technical advantages that realize one or more practical applications. As noted above, rather than relying on file system-level tracking or other mechanisms to identify deleted data during snapshot comparisons, the techniques may enable the data platform to traverse the linked tree data structures representing the two snapshots under comparison in order to identify deleted keys. By virtue of potentially avoiding file system-level tracking, the data platform may utilize less computing resources (in terms of processing cycles, memory, memory bus bandwidth, etc. and associated power consumption) given that traversing linked tree data structures is more efficient compared to traversing file systems or otherwise requiring another process to inspect file systems or to inspect read/write/delete requests to identify deletion of data, which may also reduce latency and improve data processing throughput when performing data protection operations that rely on snapshot comparisons (such as replication and/or archiving).

In one example, this disclosure describes a method comprising: identifying, by a data platform implemented by a computing system, a first tree data structure corresponding to a first snapshot of at least a first portion of a storage system at a first time; identifying, by the data platform, a second tree data structure corresponding to a second snapshot of at least a second portion of the storage system at a second later time; traversing, by the data platform, the first tree data structure and the second tree data structure to identify one or more deleted keys representative of deleted data that has been deleted from the storage system; and performing, by the data platform and based on the one or more deleted keys, a data protection operation.

In another example, this disclosure describes a computing system that implements a data platform, the computing system comprising: a memory configured to store metadata identifying, at least in part, one or more deleted keys representative of deleted data that has been deleted from a storage system; and processing circuitry configured to: identify a first tree data structure corresponding to a first snapshot of at least a first portion of the storage system at a first time; identify a second tree data structure corresponding to a second snapshot of at least a second portion of the storage system at a second later time; traverse the first tree data structure and second tree data structures to identify the one or more deleted keys associated with the deleted data that has been deleted within at least the portion of the storage system; and perform, based on the deleted keys, a data protection operation.

In another example, this disclosure describes non-transitory computer-readable storage media having instructions stored thereon that, when executed, cause one or more processors to: identify a first tree data structure corresponding to a first snapshot of at least a first portion of a storage system at a first time; identify a second tree data structure corresponding to a second snapshot of at least a second portion of the storage system at a second later time; traverse the first tree data structure and second tree data structures to identify one or more deleted keys associated with deleted data that has been deleted within at least the portion of the storage system; and perform, based on the one or more deleted keys, a data protection operation.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference characters denote like elements throughout the text and figures.

DETAILED DESCRIPTION

Figure 1A:
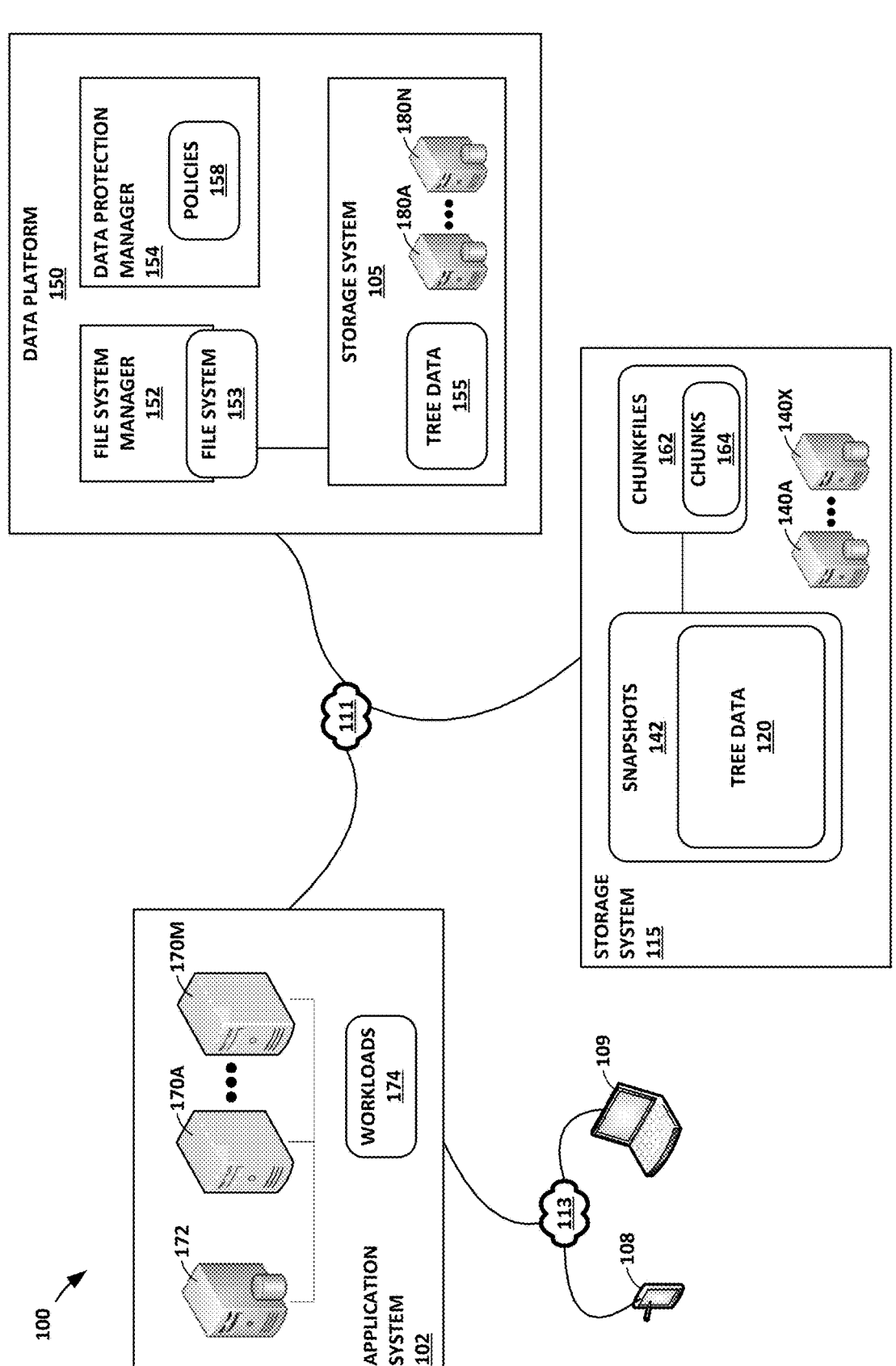
FIGS. 1A-1B are block diagrams illustrating example systems that identify deleted keys during snapshot comparisons, in accordance with one or more aspects of the techniques described in this disclosure.
Figure 1B:
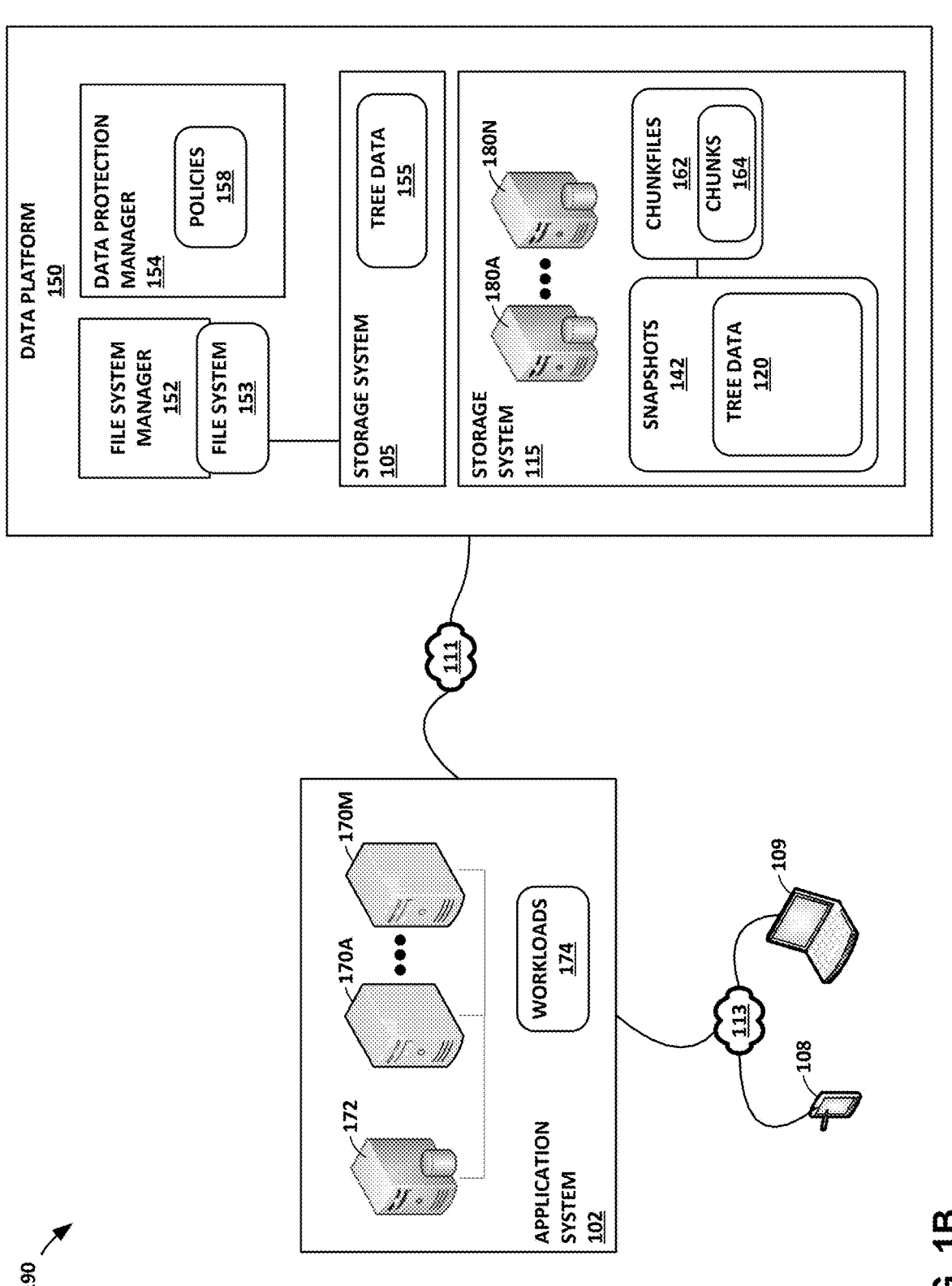

FIGS. 1A-1B are block diagrams illustrating example systems that identify deleted keys during snapshot comparisons, in accordance with one or more aspects of the techniques described in this disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and archival functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152 and data protection manager 154 in the example of system 100. In some examples, separate compute devices (not shown) execute software for data platform 150, such as file system manager 152 and data protection manager 154 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Snapshots 142 or archives created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/ storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A-1B or otherwise on network 113 and/or network 111 may be in a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. As shown in the example of FIG. 1A for instance, storage system 105 may store metadata for file system 153 in a tree data structure, such as tree data 155. Objects that are stored may include files, virtual machines, databases, applications, pods, container, any of workloads 174, system images, directory information, or other types of objects used by application system 102. Objects of different types and objects of a same type may be deduplicated with respect to one another.

Data platform 150 includes data protection manager 154 that provides backups of file system data for file system 153. In the example of system 100, data protection manager 154 stores one or more backups or snapshots 142 of file system data, stored by storage system 105, to storage system 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Storage system 115 may be considered a "backup" or "secondary" storage system for primary storage system 105. Storage system 115 may be referred to as an "external target" for snapshots 142. Where deployed and managed by a cloud storage provider, storage system 115 may be referred to as "cloud storage."

Storage system 115 may include one or more interfaces for managing transfer of data between storage system 105 and storage system 115 and/or between application system 102 and storage system 115. Data platform 150 that supports application system 102 relies on primary storage system 105 to support latency sensitive applications. However, because storage system 105 is often more difficult or expensive to scale, data platform 150 may use secondary storage system 115 to support secondary use cases such as backup, snapshot, and archive. In general, a file system backup or snapshot 142 is a copy of file system 153 to support protection of file system 153 for quick recovery, often due to some data loss in file system 153, and a file system archive ("archive") is a copy of file system 153 to support longer term retention and review. The "copy" of file system 153 may include such data as is needed to restore or view file system 153 in its state at the time of the backup or archive.

Data protection manager 154 may backup file system data for file system 153 at any time in accordance with backup policies that specify, for example, backup periodicity and timing (daily, weekly, etc.), which file system data is to be backed up, a backup retention period, storage location, access control, and so forth. An initial backup of file system data corresponds to a state of the file system data at an initial backup time (the backup creation time of the initial backup). The initial backup may include a full backup of the file system data or may include less than a full backup of the file system data, in accordance with backup policies. For example, the initial backup may include all objects of file system 153 or one or more selected objects of file system 153.

One or more subsequent incremental backups of the file system 153 may correspond to respective states of the file system 153 at respective subsequent backup creation times, i.e., after the backup creation time corresponding to the initial backup. A subsequent backup may include an incremental backup of file system 153. A subsequent backup may correspond to an incremental backup of one or more objects of file system 153. Some of the file system data for file system 153 stored on storage system 105 at the initial backup creation time may also be stored on storage system 105 at the subsequent backup creation times. A subsequent incremental backup may include data that was not previously stored in a backup at storage system 115. File system data that is included in a subsequent backup may be deduplicated by data protection manager 154 against file system data that is included in one or more previous backups, including the initial backup, to reduce the amount of storage used. (Reference to a "time" in this disclosure may refer to dates and/or times. Times may be associated with dates. Multiple backups may occur at different times on the same date, for instance.)

In system 100, data protection manager 154 stores backups of file system data to storage system 115 as snapshots 142, using chunkfiles 162. Data protection manager 154 may use any of snapshots 142 to subsequently restore the file system (or portion thereof) to its state at the snapshot creation time, or the snapshot may be used to create or present a new file system (or "view") based on the snapshot, for instance. As noted above, data protection manager 154 may deduplicate file system data included in a subsequent snapshot against file system data that is included in one or more previous snapshots. For example, a second object of file system 153 included in a second snapshot may be deduplicated against a first object of file system 153 and included in a first, earlier snapshot. Data protection manager 154 may remove a data chunk ("chunk") of the second object and generate metadata with a reference (e.g., a pointer) to a stored chunk of chunks 164 in one of chunkfiles 162. The stored chunk in this example is an instance of a chunk stored for the first object.

Data protection manager 154 may apply deduplication as part of a write process of writing (i.e., storing) an object of file system 153 to one of snapshots 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, data protection manager 154 can compute chunks having chunk sizes within the range of 16-48 kB. Data protection manager 154 may eschew deduplication for objects that that are less than 16 kB. In some example implementations, when data of an object is being considered for deduplication, data protection manager 154 compares a chunk identifier (ID) (e.g., a hash value of the entire chunk) of the data to existing chunk IDs for already stored chunks. If a match is found, data protection manager 154 updates metadata for the object to point to the matching, already stored chunk. If no matching chunk is found, data protection manager 154 writes the data of the object to storage as one of chunks 164 for one of chunkfiles 162. Data protection manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of snapshots 142, and is described in further detail below.

Each of chunkfiles 162 includes multiple chunks 164. Chunkfiles 162 may be fixed size (e.g., 8 MB) or variable size. Chunkfiles 162 may be stored co-located with snapshot metadata, such as tree data 120. In some cases, chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system.

The process of deduplication for multiple objects over multiple snapshots results in chunkfiles 162 that each have multiple chunks 164 for multiple different objects associated with the multiple snapshots. In some examples, different snapshots 142 may have objects that are effectively copies of the same data, e.g., for an object of the file system that has not been modified. An object of a snapshot may be represented or "stored" as metadata having references to chunks that enable the object to be accessed. Accordingly, description herein to a snapshot 142 "storing," "having," or "including" an object includes instances in which the snapshot does not store the data for the object in its native form.

A user or application associated with application system 102 may have access (e.g., read or write) to data that is stored in storage system 115. The user or application may delete some of the data due to a malicious attack (e.g., virus, ransomware, etc.), a rogue or malicious administrator, and/or human error. The user's credentials may be compromised and as a result, the data that is stored in storage system 115 may be subject to ransomware. To reduce the likelihood of accidental or malicious data deletion or corruption, a data lock having a data lock period may be applied to a snapshot.

As described above, chunkfiles 162 may represent an object in a snapshot storage system (shown as "storage system 115," which may also be referred to as "snapshot storage system 115") that conform to an underlying architecture of snapshot storage system 115. Data platform 150 includes data protection manager 154 that supports archiving of data in the form of chunkfiles 162, which interface with snapshot storage system 115 to store chunkfiles 162 after forming chunkfiles 162 from one or more chunks 164 of data. Data protection manager 154 may apply a process referred to as "deduplication" with respect to chunks 164 to remove redundant chunks and generate metadata linking redundant chunks to previously stored chunks 164 and thereby reduce storage consumed (and thereby reduce storage costs in terms of storage required to store the chunks).

Data protection manager 154 may organize and store file system data (e.g., one or more objects or metadata) as tree data 120. In some examples, data protection manager 154 may store tree data 120 on storage system 115. Tree data 120 may comprise one or more tree data structures including nodes linked by pointers. For example, data protection manager 154 may store tree data 120 comprising a tree data structure storing file system data (e.g., objects or metadata) of a file system at one or more nodes of the tree data structure. Data protection manager 154 may traverse the tree data 120 to locate file system data (e.g., objects or metadata of the file system). In some examples, data protection manager 154 may organize tree data 120 into one or more separate tree data structures. For example, data protection manager 154 may store tree data 120 comprising a tree data structure for metadata and a separate tree data structure for objects. In some examples, data protection manager 154 may store tree data 120 comprising a tree data structure within another tree data structure (e.g., nested tree data structure or a subtree).

A tree data structure includes a plurality of nodes where individual nodes reference one or more other nodes, such as through one or more pointers to the other nodes. The tree structure may comprise a hierarchy of nodes. For example, a tree data structure may include a root node, one or more intermediary nodes, and one or more leaf nodes, or various subsets thereof. As described above, a tree data structure may include nested tree structures (e.g., subtrees), which each may comprise a root node, one or more levels of intermediary nodes, and one or more leaf nodes, or various subsets thereof.

In some examples, data protection manager 154 may utilize a tree structure based on a B+ tree data structure. For instance, data protection manager 154 may store and retrieve file system data from a tree data structure comprising a root node and intermediary nodes that form an index for locating file system data. In this example, data protection manager 154 may store file system data (e.g., an object or metadata) at leaf nodes. In some examples, data protection manager 154 may store one or more references (e.g., pointers) to file system data at a leaf node rather than storing the file system data in the leaf node. For instance, data protection manager 154 may store one or more references (e.g., pointers) to one or more chunks 164 of an object (which may be stored at storage system 115) at a leaf node rather than storing the object or one or more chunks 164 thereof at the leaf node.

Snapshot 142 may comprise tree data 120 (e.g., tree data 120 may be used to store one or more snapshots 142). Each snapshot 142 may record or store the state of a file system at different times. For example, data protection manager 154 may store tree data 120 comprising a first snapshot 142 (which may be referred to as first snapshot 142A, which is not shown in the example of FIG. 1A) of the state of an entire file system at a first time and a second snapshot 142 (which may be referred to as second snapshot 142B, which is also not shown in the example of FIG. 1A) including incremental changes to the file system since first snapshot 142A. In some examples, data protection manager 154 may store tree data 120 including one or more snapshots 142 of the state of an entire file system and one or more snapshots 142 including incremental changes to the file system since an earlier snapshot.

Data protection manager 154 may traverse tree data 120 of a snapshot to retrieve a copy (e.g., backup) of the file system (e.g., the file system data of the file system) at a particular time, such as a time requested by a user. For example, data protection manager 154 may locate a snapshot having a timestamp matching the time requested by the user (or other time) and traverse tree data 120 starting from a root node thereof to retrieve data for the snapshot. Data protection manager 154 may retrieve one or more incremental or entire snapshots of a file system while traversing tree data 120. Data protection manager 154 may apply incremental snapshots to an earlier incremental or full snapshot to generate or output a copy of the file system for the particular time. Additional examples and techniques for storage and retrieval of file system data in a tree structure are described in "MAINTAINING AND UPDATING A BACKUP VIEW OF AN APPLICATION AND ITS ASSOCIATED OBJECTS," U.S. patent application Ser. No. 17/960,515, filed Oct. 5, 2022, the entire contents of which are hereby incorporated by reference.

As described above, snapshots 142 are typically maintained using a tree data structure (which is shown as tree data 120 in the example of FIG. 1A, where the tree data structure may conform to, e.g., a binary plus—B+—tree data structure) in which changes or updates are reflected as linked tree data structures in which a node of a first tree data structure is referenced by a node of a second tree data structure. These linked tree data structures are commonly linked between root nodes of the first tree data structure and a second subsequent tree data structure in which any nodes of the second subsequent tree data structure identify any changes to the linked first tree data structure. Traversing the linked tree data structures may enable restoration of any of the snapshots represented by the linked tree data structures (which may occur over time, such as hours, days, weeks, months, etc.), enabling data reconstruction at various points in time (e.g., at all available snapshot times) to facilitate data recovery and protection operations (such as replication and archive).

In some instances, these linked tree data structures may reference nodes across the linked tree data structures other than the root node. As an example, a root node of the second subsequent linked tree data structure may reference a child node to the root node of the first linked tree data structure.

Traversing each of the first linked tree data structure and the second subsequent tree data structure may enable data protection manager 154 to reconstruct at least the portion of the storage system at an identified snapshot time, while also reducing overhead in terms of first reconstructing each individual snapshot 142A proceeding snapshot 142B requested for reconstruction (where such overhead may refer to computing resources, such as processing cycles, memory, memory bus bandwidth, etc., and associated power consumption).

Optimization to a difference (which is another way to refer to a comparison) operation between any two snapshots (such as snapshots 142A and 142B) may allow for various keys of the linked tree data structures to be identified as updated (meaning, the underlying data has been updated—or in other words, changed—but not deleted or newly created). In this disclosure, keys may be linked to leaf nodes of the linked tree data structure and represent data stored to at least the portion of the storage system undergoing the snapshot data protection operation (where such keys are associated with a value, such as the actual underlying data—which in this instance may include chunks 164, or by way of a pointer or other indirect reference). However, often such data platforms may rely on different mechanisms to identify deleted keys between two different snapshots represented by two or more tree data structures in the linked tree data structure. As one example, the data platform may perform deleted key detection at the file-system level, which may be inefficient (in terms of the computing resources noted above) and delay transfer of data for other data protection operations (such as replication and/or archiving in which the snapshots are used to capture updates to the data over time that require replication and/or archiving).

In accordance with various aspects of the techniques described in this disclosure, data platform 150 may perform the snapshot comparison, leveraging the linked tree data structures represented in this example by tree data 155 and/or tree data 120 to identify deleted keys. Rather than rely on file system-level operations to identify deleted keys, data platform 150 may traverse each of two tree data structures of the linked tree data structure (in synchronization) to identify deleted keys. Data platform 150 may traverse each of a first tree data structure and a second tree data structure in a synchronized fashion, performing the same depth first search (DPS) with respect to each of the first and second tree data structures synchronizing each traversal of the first tree data structure with a traversal of the second tree data structure.

Prior to performing DPS, the data platform may initialize a first iterator that tracks traversal of the first tree data structure during the first DPS, and a second iterator that tracks traversal of the second tree data structure during the second DPS. A data structure tree iterator is a mechanism or object that allows for the traversal of elements within a tree data structure in a specific order, providing a way to access each node of the tree systematically. Trees are hierarchical data structures composed of nodes, where each node may have zero or more child nodes. A tree iterator abstracts the process of traversing the tree, providing methods or functions to retrieve nodes in a specific order. This can simplify the implementation of algorithms that involve processing tree structures. Iterator patterns are commonly used in programming languages to achieve this abstraction.

Based on the first iterator and the second iterator, data platform 150 may identify which of one or more first keys linked in the first tree data structure have been deleted and are no longer present in one or more keys linked in the second subsequent tree data structure. That is, when the one or more keys linked to a first node (as identified by the first iterator) of the first tree data structure is greater than the one or more keys linked to a second node (as identified by the second iterator) of the second tree data structure, the data platform may determine that the one or more first keys include one or more deleted keys representative of deleted data that has been deleted within at least the portion of storage system of application system 102 between a first time of the first snapshot and a second time of the second subsequent snapshot.

Data platform 150 may compare iteratively each one of the one or more first keys with a corresponding one of the one or more second keys during traversal of the one or more first keys and the one or more second keys. As noted above, this traversal occurs synchronously traversing each of the one or more first keys and the one or more second keys in the order defined by DFS. If one of the one or more first keys ("key1") is less than the corresponding one or more of the second keys ("key2"), data platform 150 advances the first iterator and outputs key1 as a deleted key. In this respect, various aspects of the techniques may enable data platform 150 to perform a full snapshot comparison that detects deleted keys (representative of corresponding deleted data no longer stored to at least the portion of the storage system) without potentially have to rely on underlying file system-level tracking or other mechanisms. Data platform 150 may perform this comparison in order to facilitate further data protection operations, such as replication and/or archive operations.

In operation, data platform 150 may invoke data protection manager 154 to perform a comparison operation with respect to two tree data structures represented by tree data 155. Typically, data protection manager 154 operates with respect to local tree data 155 to promote more expedient comparisons of snapshots 142 as remote comparisons may inject delay due to network conditions (e.g., network traffic that causes high latency compared to local compute), low capacity remote computing resources (e.g., as remote system storage 115 may not be contractually obligated to provide high capacity computing resources), command translation (e.g., translating commands native to data platform 150 to commands native to storage system 115), or other causes. While described with respect to local tree 155, data protection manager 154 may perform the compare operation with respect to tree data 120 stored to remote storage system or a combination of tree data 155 (e.g., where the second tree data structure may reside) and tree data 120 (e.g., where the first tree data structure may reside).

In any event, data protection manager 154 may identify a first tree data structure (which may be denoted in this example as "tree data structure 155A," although not explicitly shown in the example of FIG. 1A) corresponding to a first snapshot 142A at a first time of at least a portion of a storage system (which may be generally represented in the example of FIG. 1A as application system 102, but may actually include a storage system 105. Data protection manager 154 may also identify second tree data structure (which may be denoted in this example as "tree data structure 155B," although not explicitly shown in the example of FIG. 1A).

Tree data structure 155A may form part of snapshot 142A and tree data structure 155B may form part of snapshot 142B. Snapshot 142A and snapshot 142B represent snapshots of the same underlying storage system (or portion thereof) that occur at different times. Throughout the examples set forth in this disclosure, it is assumed that snapshot 142A occurs at a first time and snapshot 142B occurs at a second later (or, in other words, subsequent) time. Tree data structure 155A may, in this example, define an initial snapshot that provides a comprehensive representation of the storage system or an iterative snapshot that provides an update to the initial snapshot (in terms of identifying updated, changed, and/or deleted nodes) as described above. Snapshot 142B may represent an iterative snapshot that, again, provides an update to the initial snapshot (in terms of identifying updated, changed, and/or deleted nodes).

In some instances, data protection manager 154 may require a comparison of two snapshots, such as snapshot 142A and snapshot 142B, in order to support execution of a data protection operation, such as replication and/or archive operations. Data protection manager 154 may determine that this data protection operation is to be performed (possibly initiated via adherence to policies 158 that define execution of replication and/or archiving), and data protection manager 154 identifies first tree data structure 155A and second tree data structure 155B as being required to complete the data protection operation.

Data protection manager 154 may next traverse first tree data structure 155A and second tree data structure 155B to identify one or more deleted keys representative of deleted data that has been deleted within at least the portion of the storage system. Data protection manager 154 may execute two instances of the DFS algorithm to synchronously traverse each of first tree data structure 155A and second tree data structure 155B. Data protection manager 154 may synchronously traverse each of first tree data structure 155A and second tree data structure 155B by performing a single traversal with respect to first tree data structure to identify a first node and performing a single traversal with respect to second tree data structure 155B to identify a second node. Data protection module 154 may then compare the first node to the second node. Data protection module 154 may continue in this iterative manner to maintain synchronous traversal of first tree data structure 155A and second tree data structure 155B.

Each node of first tree data structure 155A may include a tree identifier ("treeID"), a node identifier ("nodeID"), and one or more keys. In this example, it is assumed that first tree data structure 155A and second tree data structure 155B are each B+ trees, which are a well-known type of tree data structure that adapts B trees to disable storing of any pointers to data at internal nodes and all pointers or other references to data are only stored at leaf nodes (where typically the pointers are considered values associated with a key in a key/value pair). Although described with respect to B+ trees, various aspects of the techniques may apply to any key, value store that can support ordered iteration (e.g., DFS algorithms, or other ordered, iterative traversal algorithms, such as breadth first search—BFS, etc.).

Data protection manager 154 may initialize a first iterator for first tree data structure 155A and a second iterator for second tree data structure 155B. The first iterator identifies a first root node of first tree data structure 155A, while the second iterator identifies a second root node of second tree data structure 155B. Data protection manager 154 may iteratively advance the first iterator to identify a first child node of the first root node identified by way of a pointer (included in the first root node) that represents a unidirectional edge (in graph data structure terminology) between the first root node and the first child node (where the first root node may also be an example of a first parent node). Likewise, data protection manager 154 may iteratively advance the second iterator to identify a second child node of the second root node identified by way of a pointer (included in the second root node) that represents a unidirectional edge (in graph data structure terminology) between the second root node and the second child node (where again the second root node may also be an example of a second parent node).

This iterative advancing of the first and second iterators along respective edges may occur in lockstep with each advancing one traversal to identify a next child node until a leaf node is reached in which various key, value pairs are defined. After each traversal, data protection manager 154 may compare a first key stored to, in this example, the first child node to a second key stored to the second child node. When the first key is less than the second key, data protection manager 154 may determine that the first key has been deleted, resulting in the deletion of any keys stored to subsequent leaf nodes interconnected (e.g., referenced by way of one or more pointers) by possibly one or more intervening nodes (when the first child node is not a leaf node) to the first child node. The above snapshot comparison algorithm may identify the deleted keys in this way as a result of the ordered nature of B+ trees and the iterative synchronous traversal provided by the DFS algorithm.

Although described with respect to identifying deleted keys, the snapshot comparison algorithm may also enable data protection manager 154 to determine one or more of whether at least one of the one or more first keys has been deleted relative to the corresponding one of the one or more second keys, whether at least one of the one or more of first keys has been updated relative to a corresponding one of the one or more second keys, and whether at least one of the one or more second keys has been created between the first time and the second later time, which is described in more detail below. As such, the snapshot comparison algorithm described herein may enable identification of deleted keys, updated keys (and conversely unchanged keys), and newly created keys that were created after the first time at which snapshot 142A was determined and before the second subsequent time at which snapshot 142B was determined.

Data protection manager 154 may next perform, based on the deleted keys, a data protection operation. As noted above, example data protection operations include a replication operation or archive operation. The deleted keys may identify data that no longer needs to be replicated and/or archived, thereby eliminating some processing overhead in performing the data protection operation. The updated keys and created keys may identify data that is to undergo the data protection operation.

The techniques of this disclosure may provide one or more technical advantages that realize one or more practical applications. As noted above, rather than relying on file system-level tracking or other mechanisms to identify deleted data during snapshot comparisons, the techniques enable data platform 150 to traverse the linked tree data structures representing the two snapshots 142A and 142B under comparison in order to identify the deleted keys. By virtue of potentially avoiding file system-level tracking, data platform 150 may utilize less computing resources (in terms of processing cycles, memory, memory bus bandwidth, etc. and associated power consumption) given that traversing linked tree data structures is more efficient compared to traversing file systems or otherwise requiring another process to inspect file systems or to inspect read/write/delete requests to identify deletion of data, which may also reduce latency and improve data processing throughput when performing data protection operations that rely on snapshot comparisons (such as, again, replication and/or archiving).

System 190 of FIG. 1B is a variation of system 100 of FIG. 1A in that data platform 150 stores snapshots 142 using chunkfiles 162 stored to snapshot storage system 115 that resides on premises or, in other words, local to data platform 150. In some examples of system 190, storage system 115 enables users or applications to create, modify, or delete chunkfiles 162 via file system manager 152. In system 190, storage system 105 of FIG. 1B is the local storage system used by data protection manager 154 for initially storing and accumulating chunks prior to storage at storage system 115. Data protection manager 154 may store tree data 120 comprising nodes with references (e.g., pointers) to one or more chunks 164 at storage system 115. Though not shown, data protection manager 154 may store tree data 120 and checksums 130 at storage system 105 in addition to or instead of storage system 115, regardless of whether or not storage system 115 is remote or local to data platform 150, in some examples.

Figure 2:
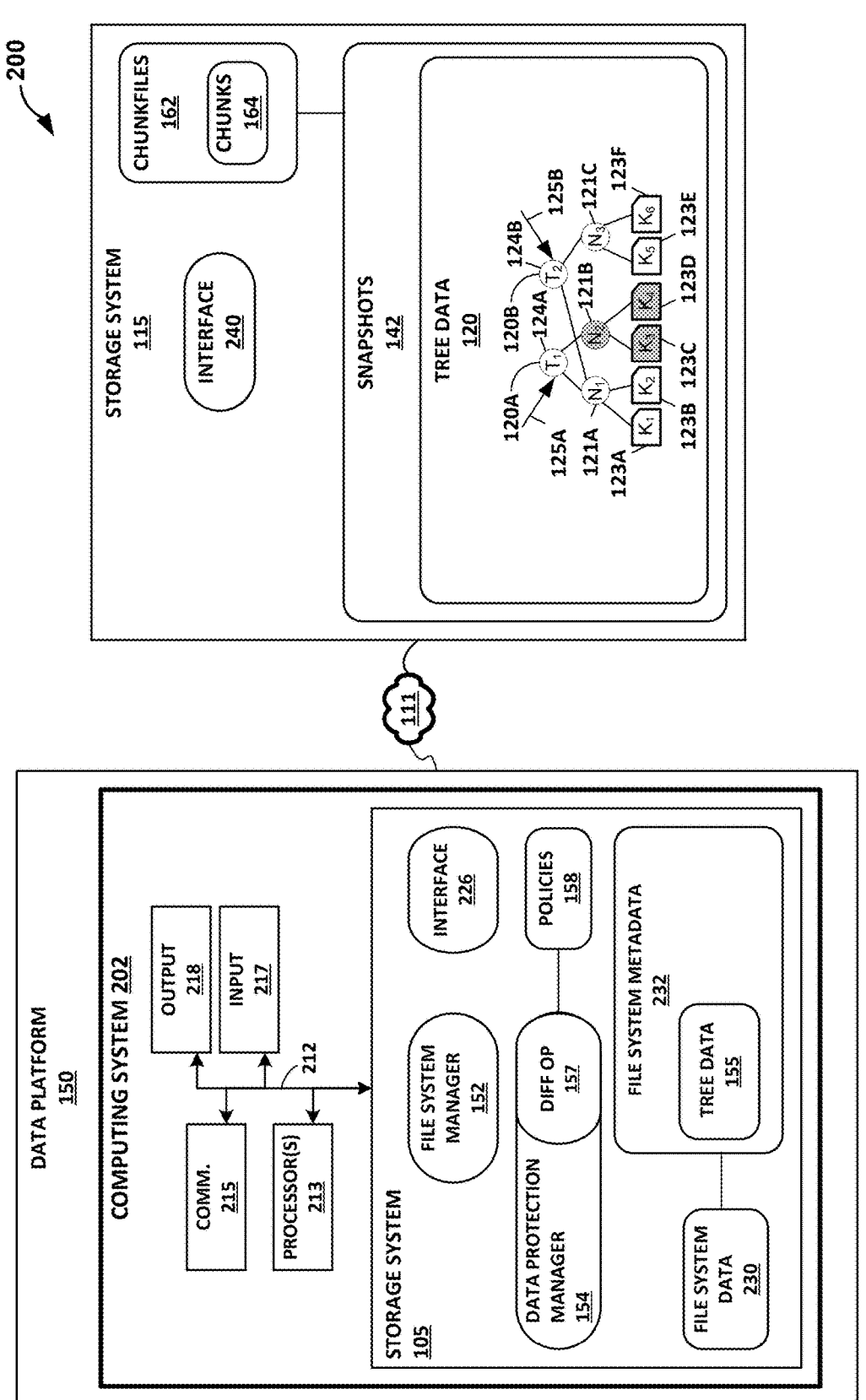
FIG. 2 is a block diagram illustrating an example system performs snapshot comparisons that include deleted key detection, in accordance with techniques of this disclosure.

FIG. 2 is a block diagram illustrating an example system performs snapshot comparisons that include deleted key detection, in accordance with techniques of this disclosure. System 200 of FIG. 2 may be described as an example or alternate implementation of system 100 of FIG. 1A or system 190 of FIG. 1B (where chunkfiles 162 are written to a local snapshot storage system 115). Data protection manager 154 may store tree data 120 including one or more nodes with references (e.g., pointers) to chunks 164 at local snapshot storage system 115. One or more aspects of FIG. 2 may be described herein within the context of FIG. 1A and FIG. 1B.

In the example of FIG. 2, system 200 includes network 111, data platform 150 implemented by computing system 202, and storage system 115. In FIG. 2, network 111, data platform 150, and storage system 115 may correspond to network 111, data platform 150, and storage system 115 of FIG. 1A. Although only one snapshot storage system 115 is depicted, data platform 150 may apply techniques in accordance with this disclosure using multiple instances of snapshot storage system 115. The different instances of storage system 115 may be deployed by different cloud storage providers, the same cloud storage provider, by an enterprise, or by other entities.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of local storage system 105. Local storage system 105 may include interface module 226, file system manager 152, and policies 158 as well as data protection manager 154. One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include micropro-cessors, application processors, display controllers, auxil-iary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 105 within computing system 202 may store information for processing during operation of computing system 202, such as random access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and local storage system 105 may retrieve, store, and/or execute the instructions and/or data of one or more applications, modules, or software. Processors 213 and/or storage devices of local storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage file system metadata 232 for structuring file system data 230 for file system 153, and store file system metadata 232 and file system data 230 to local storage system 105. File system metadata 232 may include one or more trees, such as tree data 155, that describe objects within file system 153 and the file system 153 hierarchy, and can be used to write or retrieve objects within file system 153. File system manager 152 may interact with and/or operate in conjunction with one or more modules of computing system 202, including interface module 226 and data protection manager 154.

Data protection manager 154 may perform functions relating to backing up file system 153, as described above with respect to FIG. 1A, including operations described above with respect to checksum module 160. Data protection manager 154 may generate one or more snapshots 142 and cause file system data 230 to be stored as tree data 120 and chunks 164 within chunkfiles 162 in snapshot storage system 115. Data protection manager 154 may apply a deduplication process to selectively deduplicate chunks of objects within file system data 230, in accordance with one or more policies 158. Data protection manager 154 may generate and manage tree data 120 for generating, viewing, retrieving, or restoring any of snapshots 142. Data protection manager 154 may generate and manage tree data 120 for generating, viewing, retrieving, or restoring objects stored as chunks 164 (and references thereto) within chunkfiles 162, for any of snapshots 142. Stored objects may be represented and manipulated using logical files for identifying chunks for the objects.

Local storage system 105 may store a chunk table that describes chunks 164. The chunk table may include respective chunk IDs for chunks 164 and may contain pointers to chunkfiles 162 and offsets within chunkfiles 162 for retrieving chunks 164 from storage system 115. Chunks 164 are written into chunkfiles 162 at different offsets. By comparing new chunk IDs to the chunk table, data protection manager 154 can determine if the data already exists on the system. If the chunks already exist, data can be discarded and metadata for an object may be updated to reference the existing chunk. Data protection manager 154 may use the chunk table to look up the chunkfile identifier for the chunkfile that contains a chunk.

Local storage system 105 may include a chunkfile table that describes respective physical or virtual locations of chunkfiles 162 on storage system 115, along with other metadata about the chunkfile, such as a checksum, encryption data, compression data, etc. In FIG. 2, data protection manager 154 stores tree data 120 to local storage system 105. In some examples, data protection manager 154 causes some or all of tree data 120 to be stored to snapshot storage system 115. Data protection manager 154, optionally or in conjunction with file system manager 152, may use tree data 120 and/or file system metadata 232 to restore any of snapshots 142 to a file system implemented by data platform 150, which may be presented by file system manager 152 to other systems.

Interface module 226 may execute an interface by which other systems or devices may determine operations of file system manager 152 or data protection manager 154. Another system or device may communicate via an interface of interface module 226 to specify one or more policies 158.

System 200 may be modified to implement an example of system 190 of FIG. 1B. In the modified system 200, chunkfiles 162 are stored to a local snapshot storage system 115 to support snapshots 142.

Interface module 240 of snapshot storage system 115 may execute an interface by which other systems or devices may create, modify, delete, or extend a "write once read many" (WORM) lock expiration time for any of chunkfiles 162. Interface module 240 may execute and present an API. The interface presented by interface module 240 may be a gRPC, HTTP, RESTful, command-line, graphical user, web, or other interface.

In the example of FIG. 2, data platform 150 may invoke data protection manager 154 to perform one or more data protection operations with respect to file system 153. Data protection manager 154 may coordinate with file system manager 152 to perform the data protection operations, which as noted above may include replication and/or archiving. In performing the data protection operations, data protection manager 154 may invoke difference operation 157 ("DIFF OP 157") that receives as inputs an indication of a first snapshot (e.g., snapshot 142A represented in part by a first tree data structure 120A) and a second snapshot (e.g., snapshot 142B represented in part by a second tree data structure 120B).

In the example of FIG. 2, tree data 120 defines a linked tree data structure in which first tree data structure 120A is referenced by second tree data structure 120B. First tree data structure 120A includes a first root node (which may be referred to as first root node 124A and/or root node "$T_1$") and first children nodes 121A ("$N_1$") and 121B ("$N_2$"), where first child node 121A references first keys 123A ("$K_1$") and 123B ("$K_2$") and first child node 121B ("$N_2$") references first keys 123C ("$K_3$") and 123D ("$K_4$"). Second tree data structure 120B may include a second root node (which may be referred to as second root node 124B and/or root node "$T_2$"), second child nodes 121A ("$N_1$") and 121C ("$N_3$"), where second child node 121A ("$N_3$") references second keys 123A ("$K_1$") and 123B ("$K_2$") and second child node 121C references second keys 123E ("$K_5$") and 123F ("$K_6$"). Edges, while not explicitly enumerated in the example of FIG. 2 for ease of illustration purposes, are shown within tree data structures 120A and 120B by solid lines interconnecting root nodes 124A and 124B and child nodes 121A-121C, and interconnecting child nodes 121A-121C and keys 123A-123F.

Further, as noted above, linked tree data structures may allow for interconnections between two different tree data structures. In the example shown in FIG. 2, tree data structure 120B includes second root node 124B that references (e.g., via a pointer forming an edge) first child node 121A of first tree data structure 120A (where first root node 124A also references first child node 121A). Second tree data structure 120B may therefore represent second snapshot 142B that represents an iterative snapshot relative to base or initial first snapshot 142A represented as first tree data structure 120A.

Difference operation 157 may begin by initializing a first iterator 125A for traversing first tree data structure 120A and a second iterator 125B for synchronously (with respect to traversal of first tree data structure 120A) traversing second tree data structure 120B. First iterator 125A may represent a pointer initialized to identify first root node 124A and, likewise, second iterator 125B may represent a pointer initialized to identify second root node 124B. Difference operation 157 may next synchronously traverse, based on first iterator 125A and second iterator 125B, first tree data structure 120A and second tree data structure 120B to identify the one or more deleted keys (e.g., first keys 123C and 123D, where deletion is denoted by a grey fill for first child node 121B and first keys 123C and 123D) representative of the deleted data previously stored by at least the portion of the storage system at the first time (corresponding to snapshot 142A).

Difference operation 157 may invoke a first instance of a DFS function, passing first iterator 125A to the first instance of the DFS function. Difference operation 157 may also invoke a second instance of the DFS function, passing second iterator 125B to the second instance of the DFS function. The first instance of the DFS function may advance first iterator 125A along a first edge of first tree data structure 120A (e.g., the left edge) from a first parent node 120A (where first root node 124A may represent a first parent node 124A) to identify first child node 121A of first parent node 124A. Likewise, to maintain synchronous traversal, the second instance of the DFS function may advance second iterator 125B along a second edge of second tree data structure 120B (e.g., the left edge) from a second parent node 124B (where second root node 124B may represent a second parent node 124B) to identify second child node 121A of second parent node 124B.

Difference operation 157 may next determine whether first child node 121A (referenced by first iterator 125A) has changed relative to second child node 121A (referenced by second iterator 125A). As shown in the example of FIG. 2, first child node 121A is the same as second child node 121A, but this only implies that first child node 121A is preserved in second snapshot 142B and not deleted or created, but in other cases first child node 121A may have been updated (or, in other words, changed and/or modified). As noted above, each node, including root nodes 124A and 124B, and nodes 121A-121C include a node identifier ("nodeID"), which identifies each node. The node identifier can be an integer, a reference, an address, a string, or other identifier. In this example, it is assumed that node 121A has not changed, which would indicate a nodeID that is the same as the nodeID for second child node 121A. Accordingly, difference operation 157 may be optimized to skip processing of keys 123A and 123B given that first child node 121A has not changed and therefore no processing of keys 123A and 123B is required.

Based on determining that first child node 121A is the same as second child node 121A, difference operation 157 may advance first iterator 125A to traverse the next edge according to the first instance of the DFS function. As such, the first instance of the DFS function may advance first iterator 125A along the edge between first root node 124A and first child node 121B to identify first child node 121B. Likewise, the second instance of the DFS function may perform similar operations to the first instance of the DFS function and skip processing of keys 123A and 123B prior to advancing second iterator 125B along the edge between second root node 124B and second child node 121C. In this respect, data protection manager 154 may synchronously traverse each of tree data structures 120A and 120B in lockstep, iteratively advancing each of iterators 125A and 125B to traverse each of tree data structures 120A and 120B synchronously.

Difference operation 157 may compare first child node 121B to second child node 121C and determine that first child node 121C has changed relative to second child node 121B. Difference operation 157 may determine one or more first keys 123C and 123D associated with first child node 121B, where first keys 123C and 123D are associated with data stored by at least the portion of the file system at the first time (of snapshot 142A). Difference operation 157 may next determine one or more second keys 123E and 123F associated with second child node 121C, wherein second keys 123E and 123F are associated with changed data stored by at least the portion of the storage system that has changed between the first time and the second later time (of snapshot 142B).

Difference operation 157 may next advance first iterator 125A to first key 123C, while also advancing second iterator 125B to second key 123E. Difference operation 157 may advance each of first iterator 125A and second iterator 125B, to compare each of first keys 123C and 123D to a corresponding one of second keys 123E and 123F. Difference operation 157 may next, based on the comparison of each of first keys 123C and 123D to the corresponding one of second keys 123E and 123F, determine one or more of whether at least one of first keys 123C and 123D has been deleted relative to the corresponding one of second keys 123E and 123F, whether at least one of first keys 123C and 123D has been updated relative to the corresponding one of second keys 123E and 123F, and whether at least one of second keys 123E and 123F has been created between the first time and the second later time.

In this example, difference operation 157 may determine that first key 123C is less than second key 123E. That is, B+ trees arrange data to generally improve search, rebalancing the tree to rearrange data such that root nodes generally represent about halfway between the overall range of key values, where the left edge (subtree) from the root node represents from zero to halfway of the range and the right edge (subtree) represents halfway to the highest value in the range of keys. As noted above, the techniques set forth in this disclosure are described with respect to B+ trees, but may be applicable to various other different types of tree data structures and/or key, value-based data structures having a given ordering scheme. In these data structures different from B+ trees, the various rules (such as key1 being greater than key2, etc.) may need to be adjusted, inverted, or manipulated to enable different tree data structures and/or different iterative traversal algorithms.

In any event, difference operation 157 may determine, when the one of first keys 123C and 123D are less than the corresponding one of second keys 123E and 123F, that the one of first keys 123C and 123D are included in the deleted keys. In this example, both of first keys 123C and 123D are included in the deleted keys, for second tree data structure 120B does not reference first child node 121B. An optimization exists in which difference operation 157 may determine that first child node 121B was skipped (e.g., not referenced by second tree data structure 120B, which may reference all child nodes 121A and 121B of first tree data structure 120A by having the left edge from second root node 124B interconnect with first root node 120A rather than first child node 121A). In this optimization, difference operation 157 may determine a range of first keys 123C and 123D identified by first child node 121B that was skipped, where the range identifies first keys 123C and 123D that represent skipped keys 123C and 123D. Difference operation 157 may then determine that skipped keys 123C and 123D are the deleted keys, avoiding the processing necessary to individually compare first key 123C to second key 123E and first key 123D to second key 123F. Difference operation 157 may next advance, based on the range, first iterator 125A past the one or more skipped keys 123C and 123D.

Assuming this optimization is not performed for purposes of further discussion of various aspects of the techniques described in this disclosure, difference operation 157 may determine, when one of first keys 123C and 123D is greater than one or more of second keys 123E and 123F, that the corresponding one of second keys 123E and 123F has been created. In this example, second keys 123E and 123F are less than respective one of first keys 123C and 123D, whereupon difference operation 157 may determine that both second keys 123E and 123F have been created.

It was assumed above that first child node 121A and second child node 121A were the same, but there are instances where first child node 121A and second child node 121A are not the same. In these instances, difference operation 157 may determine, when one of first keys 123A and 123B is the same as the corresponding one of second keys 123A and 123B, a first treeID included in the one of first keys 123A and 123B and a second treeID included in the corresponding one of second keys 123A and 123B. Difference operation 157 may determine, when the first treeID is different from the second treeID, that the corresponding one of second keys 123A and 123B is associated with updated data that has been updated relative to data associated with the one of first keys 123A and 123B. Alternatively, difference operation 157 may determine, when the first treeID is not different than second treeID, that the corresponding one of second keys 123A and 123B is associated with unchanged data that has not been changed relative to the data associated with the one of first keys 123A and 123B.

In this way, difference operation 157 may determine one or more of whether at least one of first keys 123C and 123D has been deleted relative to the corresponding one of second keys 123E and 123F, whether at least one of first keys 123C and 123D has been updated relative to the corresponding one of second keys 123E and 123F, and whether at least one of second keys 123E and 123F has been created between the first time and the second later time. Difference operation 157 may output a list of deleted keys, a list of updated keys, and a list of created keys, which data protection manager 154 may utilize when performing the data protection operation.

In other words, generating differences ("diffs") between two trees is used to perform incremental data transfer in support of data protection operations (e.g., archival and replication). However, these diffs may not identify keys deleted from the original B+ tree that are not present in the new B+ tree. Without identification of deleted keys, data platform 150 may not maintain the replicated copy consistent with the source copy. One implementation of replication keeps track of deleted keys at the file system level, which can be slow. The techniques described in this disclosure may provide a way in which to compute the deleted keys between two B+ trees by processing only the B+ trees.

According to various aspects of the techniques described in this disclosure, difference operation 157 may implement two iterators 125A and 125B over the B+ trees T1 (base) and T2 (iterative). Here, the assumption is that T2 is a clone of T1 and has been modified by one or more of adding, deleting, and/or updating the keys. At each stage of the iteration, current iterators 125A and 125B point to some keys in both B+ trees. If key1<key2, iterator 1 (125A) is advanced and key1 is output as a deleted key. If key 1>key 2, iterator 2 (125B) is advanced and key 2 is output as a created key. If key1 is equal to key 2, then key 2 could be updated or be the same as original tree. Difference operation 157 may check the B+ tree node identifiers of two keys, if they are the same then we consider key2 to be an unchanged key. Otherwise, difference operation 157 outputs key2 as an updated key.

Additionally, since T2 is a clone of T1, difference operation 157 can leverage the cloned nature of T2 to speed up the iteration. If a sub tree is encountered during iteration of T2 which has a treeID of T1, then the entire sub tree can be discarded in T2. However, the max key that is present in the discarded sub tree, K_MAX, is obtained. K_MAX may be used to advance the iteration of T1 by seeking to the lower bound of K_MAX. The iteration continues in this manner until the trees have no more keys left to be processed. The above algorithm is not specific to B+ trees and can be implemented over any key, value store that can support ordered iteration, support obtaining the max key in a range, and support resuming iteration for any given key efficiently.

In addition, given a snapshot T2 and a base snapshot T1, difference operation 157 may produce a list of Created, Updated and Deleted keys of the snapshot T2 as compared to the base snapshot T1. Keys refer to the snapshot objects or keys of the view tree of the file system/namespace of the local snapshot.

Either snapshot 142A and 142B can be present locally or in a cloud-based data plane. In case both snapshots 142 are present locally, difference operation 157 may implement a LocalDiff algorithm to generate this output. If any of snapshots 142 are in the cloud, difference operation 157 may implement a CloudDiff algorithm. CloudDiff is also used for calculating reverse diffs for restores where the base snapshot is present locally.

For LocalDiff, difference operation 157 may perform the following:

Input: snap_tree_1, snap_tree_2
Assumptions:
   1. snap_tree_1 is an ancestor of snap_tree_2
   2. snap_tree_1 was previously archived
Output: Stream of snap tree key diffs in increasing order of keys
Algorithm
   1. Get the tree_ids of namespaces for snap_tree_2. Get the MaxOwnerTreeIds for snap_tree_1.
   2. Initialize two iterators for the snap trees for traversing the trees using postorder DFS.

3. In a loop, check the keys each iterator points to and compare them.
   4. if iter_1 compares less than iter_2, advance iter_1 and output the corresponding key as a "Deleted" key.
   5. If the iterators point to the same key, check if tree ids are different, if so, output the keys as an "Updated" key. Advance both iterators.
   6. If iter_1 compares greater than iter_2, output the key as a "Created" key and advance iter_2.

At runtime, difference operation 157 may implement LocalDiff in O(N) time, where N is the size of the B+ tree. However, difference operation 157 can improve the constant factor by avoiding traversal down to the leaf nodes in some instances (as noted above). The key_child_ptr_vec contains the tree_id, node_id, and key information which is all that is required to generate the diff. The actual lookup for the changed keys can be done by the caller, as required.

This optimization leverages a tree_id floor. Difference operation 157 may use T1->MaxOwnerTreeId when traversing T2 to skip any portions of the tree that have not been updated. Any sub trees with a tree_id less than or equal to tree_id_1 can be skipped completely. However, difference operation 157 may still need to traverse tree_1 to output deleted keys, since some keys may have been deleted in tree_1 in the key range that got skipped.

Difference operation 157 may keep track of the max_key_skipped whenever a sub tree gets skipped in the traversal of tree_2. If multiple sub trees get skipped, then difference operation 157 may update the max_key_skipped when required. Once difference operation 157 has the overall max_key_skipped, the tree_1 iterator (125A) can be advanced directly to the max_key_skipped. Difference operation 157 may continue traversal of tree_1 and any keys in the range (max_key_skipped, iter2->key) will be output as "Deleted"

In the example shown in FIG. 2, after advancing iterator 125B for T2, it points to k4 (skipping k0 and k1). Advancing will return max_key_skipped as k1, by doing a Lookup-MaxKey on n1 (the node that gets pruned). Traversing T1 for the range (k1, k4) will give us any deleted keys (k2 and k3). LookupMaxKey can run in log (N) time. With this optimization difference operation 157 may reduce the runtime to C log (N) where C is the number of changed keys.

The CloudDiff algorithm (which operates with respect to snapshots 142 stored remotely) may be largely the same as local diff (which operates with respect to snapshots 142 stored locally). The difference is that the iterator will be a cloud snapshot iterator class. Traversal can be optimized using the tree_id floor as well.

Figure 3:
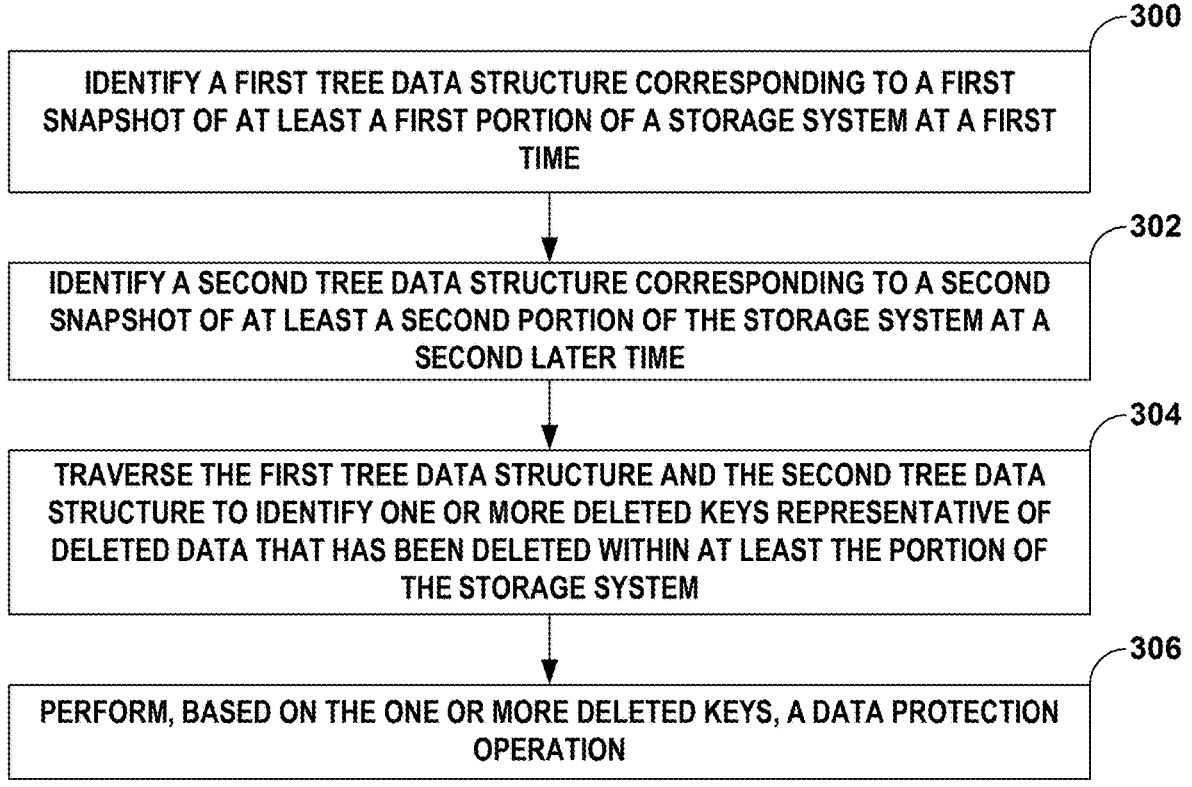
FIG. 3 is a flowchart illustrating example operation of the data platform shown in any of the examples of FIGS. 1A, 1B, 2 in performing various aspects of the snapshot comparison techniques.

FIG. 3 is a flowchart illustrating example operation of the data platform shown in any of the examples of FIGS. 1A, 1B, 22 in performing various aspects of the snapshot comparison techniques. In the example of FIG. 3, data platform 150 may invoke data protection manager 154 to perform a comparison operation (which is another way to refer to difference operation 157 shown in the example of FIG. 2) with respect to two tree data structures represented by tree data 155.

Data protection manager 154 may identify a first tree data structure (which may be denoted in this example as "tree data structure 155A," although not explicitly shown in the example of FIG. 1A) corresponding to a first snapshot 142A at a first time of at least a first portion of a storage system (which may be generally represented in the example of FIG. 1A as application system 102, but may actually include a storage system stored by database server 172 and/or one or more of application servers 170) (300). Data protection manager 154 may also identify second tree data structure (which may be denoted in this example as "tree data structure 155B," although not explicitly shown in the example of FIG. 1A) (302).

Tree data structure 155A may form part of snapshot 142A and tree data structure 155B may form part of snapshot 142B. Snapshot 142A and snapshot 142B represent snapshots of the same underlying storage system (or portion thereof) that occur at different times (e.g., a first time, and a second later time). Throughout the examples set forth in this disclosure, it is assumed that snapshot 142A occurs at a first time and snapshot 142B occurs at a second later (or, in other words, subsequent) time. Tree data structure 155A may, in this example, define an initial snapshot that provides a comprehensive representation of the storage system or an iterative snapshot that provides an update to the initial snapshot (in terms of identifying updated, changed, and/or deleted nodes) as described above. Snapshot 142B may represent an iterative snapshot that, again, provides an update to the initial snapshot (in terms of identifying updated, changed, and/or deleted nodes).

In some instances, data protection manager 154 may require a comparison of two snapshots, such as snapshot 142A and snapshot 142B, in order to support execution of a data protection operation, such as replication and/or archive operations. Data protection manager 154 may determine that this data protection operation is to be performed (possibly initiated via adherence to policies 158 that define execution of replication and/or archiving operation(s)), and identify first tree data structure 155A and second tree data structure 155B as being required to complete the data protection operation.

Data protection manager 154 may next traverse first tree data structure 155A and second tree data structure 155B to identify one or more deleted keys representative of deleted data that has been deleted within at least the portion of the storage system (304). Data protection manager 154 may execute two instances of the DFS algorithm to synchronously traverse each of first tree data structure 155A and second tree data structure 155B. Data protection manager 154 may synchronously traverse each of first tree data structure 155A and second tree data structure 155B by performing a single traversal with respect to first tree data structure to identify a first node and performing a single traversal with respect to second tree data structure 155B to identify a second node. Data protection module 154 may then compare the first node to the second node. Data protection module 154 may continue in this iterative manner to maintain synchronous traversal of first tree data structure 155A and second tree data structure 155B.

Each node of first tree data structure may include a tree identifier ("treeID"), a node identifier ("nodeID"), and one or more keys. In this example, it is assumed that first tree data structure 155A and second tree data structure 155B are each B+ trees, which are a well-known type of tree data structure that adapts B trees to disable storing of any pointers to data at internal nodes (which may also be referred to as intervening nodes) and all pointers or other references to data are only stored at leaf nodes (where typically the pointers are considered values associated with a key in a key/value pair). Although described with respect to B+ trees, various aspects of the techniques may apply to any key, value store that can support ordered iteration (e.g., DFS algorithms, or other ordered, iterative traversal algorithms, such as breadth first search-BFS, etc.).

Data protection manager 154 may initialize a first iterator for first tree data structure 155A and a second iterator for second tree data structure 155B. The first iterator identifies a first root node of first tree data structure 155A, while the second iterator identifies a second root node of second tree data structure 155B. Data protection manager 154 may iteratively advance the first iterator to identify a first child node of the first root node identified by way of a pointer (included in the first root node) that represents a unidirectional edge (in graph data structure terminology) between the first root node and the first child node (where the first root node may also be an example of a first parent node). Likewise, data protection manager 154 may iteratively advance the second iterator to identify a second child node of the second root node identified by way of a pointer (included in the second root node) that represents a unidirectional edge (in graph data structure terminology) between the second root node and the second child node (where again the second root node may also be an example of a second parent node).

This iterative advancing of the first and second iterators along respective edges may occur in lockstep with each advancing one traversal to identify a next child node until a leaf node is reached in which various key, value pairs are defined. After each traversal, data protection manager 154 may compare a first key stored to, in this example, the first child node to a second key stored to the second child node. When the first key is less than the second key, data protection manager 154 may determine that the first key has been deleted, resulting in the deletion of any keys stored to subsequent leaf nodes interconnected (e.g., referenced by way of one or more pointers) by possibly one or more intervening nodes (when the first child node is not a leaf node) to the first child node. The above snapshot comparison algorithm may identify the deleted keys in this way as a result of the ordered nature of B+ trees and the iterative synchronous traversal provided by the DFS algorithm.

Although described with respect to identifying deleted keys, the snapshot comparison algorithm may also enable data protection manager 154 to determine one or more of whether at least one of the one or more first keys has been deleted relative to the corresponding one of the one or more second keys, whether at least one of the one or more of first keys has been updated relative to a corresponding one of the one or more second keys, and whether at least one of the one or more second keys has been created between the first time and the second later time, which is described in more detail below. As such, the snapshot comparison algorithm described herein may enable identification of deleted keys, updated keys (and conversely unchanged keys), and newly created keys that were created after the first time at which snapshot 142A was determined and before the second subsequent time at which snapshot 142B was determined.

Data protection manager 154 may next perform, based on the deleted keys, a data protection operation (306). As noted above, example data protection operations include a replication operation or archive operation. The deleted keys may identify data that no longer needs to be replicated and/or archived, thereby eliminating some processing overhead in performing the data protection operation. The updated keys and created keys may identify data that is to undergo the data protection operation.

In this way, various aspects of the techniques may enable the following examples.

Example 1. A method comprising: identifying, by a data platform implemented by a computing system, a first tree data structure corresponding to a first snapshot of at least a first portion of a storage system at a first time; identifying, by the data platform, a second tree data structure corresponding to a second snapshot of at least a second portion of the storage system at a second later time; traversing, by the data platform, the first tree data structure and the second tree data structure to identify one or more deleted keys representative of deleted data that has been deleted from the storage system; and performing, by the data platform and based on the one or more deleted keys, a data protection operation.

Example 2. The method of example 1, wherein the first tree data structure includes a first root node, one or more first child nodes, and one or more first edges interconnecting the first root node to one or more first child nodes, and wherein the second tree data structure includes a second root node, at least one second child node, and a plurality of second edges interconnecting the second root node to the at least one second child node and to at least one of the one or more first child nodes of the first tree data structure.

Example 3. The method of any one of examples 1 and 2, wherein traversing the first tree data structure and the second tree data structure comprises: initializing a first iterator for traversing the first tree data structure and a second iterator for traversing the second tree data structure, wherein the first iterator identifies a first root node of the first tree data structure and the second iterator identifies a second root node of the second tree data structure; and synchronously traversing, based on the first iterator and the second iterator, the first tree data structure and second tree data structure to identify the one or more deleted keys representative of the deleted data previously stored by the storage system at the first time.

Example 4. The method of any one of examples 1-3, wherein traversing the first tree data structure and the second tree data structure comprises: initializing a first iterator for traversing the first tree data structure and a second iterator for traversing the second tree data structure; advancing the first iterator along a first edge of the first tree data structure from a first parent node of the first tree data structure to identify a first child node of the first parent node; advancing the second iterator along a second edge of the second tree data structure from a second parent node in the second tree data structure to identify a second child node of the second parent node; and determining whether the second child node has changed relative to the first child node.

Example 5. The method of example 4, wherein determining whether the first child node has changed relative to the second child node comprises: determining one or more first keys associated with the first child node, wherein the one or more first keys are associated with data stored by at least the first portion of the storage system at the first time; determining one or more second keys associated with the second child node, wherein the one or more second keys are associated with changed data stored by at least the second portion of the storage system that has changed between the first time and the second later time; advancing each of the first iterator and the second iterator to traverse each of the one or more first keys and the one or more second keys to compare each of the one the one or more first keys to a corresponding one of the one or more second keys; determining, based on the comparison of each of the one the one or more first keys to the corresponding one of the one or more second keys, one or more of whether at least one of the one or more first keys has been deleted relative to the corresponding one of the one or more second keys, whether at least one of the one or more of first keys has been updated relative to the corresponding one of the one or more second keys, and whether at least one of the one or more second keys has been created between the first time and the second later time.

Example 6. The method of example 5, wherein determining one or more of whether the at least one of the one or more first keys has been deleted relative to the corresponding one of the one or more second keys, whether the at least one of the one or more of first keys has been updated relative to the corresponding one of the one or more second keys, and whether the at least one of the one or more second keys has been created between the first time and the second later time comprises determining, when the one of the one or more first keys is less than the corresponding one of the one or more second keys, that the one of the one or more first keys is included in the one or more deleted keys.

Example 7. The method of any one of examples 5 and 6, wherein determining one or more of whether the at least one of the one or more first keys has been deleted relative to the corresponding one of the one or more second keys, whether the at least one of the one or more of first keys has been updated relative to the corresponding one of the one or more second keys, and whether the at least one of the one or more second keys has been created between the first time and the second later time comprises: determining, when the one of one of the one or more first keys is the same as the corresponding one of the one or more second keys, whether a first tree identifier included in the one of the one or more first keys is different from a second tree identifier included in the corresponding one of the one or more second keys; determining, when the first tree identifier is different from the second tree identifier, that the corresponding one of the one or more second keys is associated with updated data that has been updated relative to data associated with the one of the one or more first keys; and determining, when the first tree identifier is not different from the second tree identifier, that the corresponding one of the one or more second keys is associated with unchanged data that has not been changed relative to the data associated with the one of the one or more first keys.

Example 8. The method of any one of examples 5-7, wherein determining one or more of whether the at least one of the one or more first keys has been deleted relative to the corresponding one of the one or more second keys, whether the at least one of the one or more of first keys has been updated relative to the corresponding one of the one or more second keys, and whether the at least one of the one or more second keys has been created between the first time and the second later time comprises determining, when one of the one or more first keys is greater than the one or more second keys, that the corresponding one of the one or more second keys has been created.

Example 9. The method of any one of examples 4-8, wherein determining that the first child node has changed relative to the second child node comprises: determining a range of the one or more first keys identified by the first child node that were skipped, where the range identifies the one or more first keys that represent one or more skipped first keys; determining that the one or more skipped first keys are the one or more deleted keys; and advancing, based on the range, the first iterator past the one or more skipped first keys.

Example 10. The method of any one of examples 1-9, wherein traversing the first tree data structure and the second tree data structure comprises executing respective instances of a depth first search algorithm to synchronously traverse each of the first tree data structure and the second tree data structure.

Example 11. The method of any one of examples 1-10, wherein the first tree data structure comprises a first B+ tree data structure, and wherein the second tree data structure comprises a second B+ tree data structure.

Example 12. The method of any one of examples 1-11, wherein one or more of the first snapshot and the second snapshot are stored remote from the data platform in a cloud storage system.

Example 13. A computing system that implements a data platform, the computing system comprising: a memory configured to store metadata identifying, at least in part, one or more deleted keys representative of deleted data that has been deleted from a storage system; and processing circuitry configured to: identify a first tree data structure corresponding to a first snapshot of at least a first portion of the storage system at a first time; identify a second tree data structure corresponding to a second snapshot of at least a second portion of the storage system at a second later time; traverse the first tree data structure and second tree data structures to identify the one or more deleted keys associated with the deleted data that has been deleted within at least the portion of the storage system; and perform, based on the deleted keys, a data protection operation.

Example 14. The computing system of example 13, wherein the processing circuitry is, when traversing the first tree data structure and the second tree data structure, configured to: initialize a first iterator for traversing the first tree data structure and a second iterator for traversing the second tree data structure; advance the first iterator along a first edge of the first tree data structure from a first parent node of the first tree data structure to identify a first child node of the first parent node; advance the second iterator along a second edge of the second tree data structure from a second parent node in the second tree data structure to identify a second child node of the second parent node; and determine whether the second child node has changed relative to the first child node.

Example 15. The computing system of example 14, wherein the processing circuitry is, when determining whether the first child node has changed relative to the second child node, configured to: determine one or more first keys associated with the first child node, wherein the one or more first keys are associated with data stored by at least the first portion of the storage system at the first time; determine one or more second keys associated with the second child node, wherein the one or more second keys are associated with changed data stored by at least the second portion of the storage system that has changed between the first time and the second later time; advance each of the first iterator and the second iterator to traverse each of the one or more first keys and the one or more second keys to compare each of the one the one or more first keys to a corresponding one of the one or more second keys; determine, based on the comparison of each of the one the one or more first keys to the corresponding one of the one or more second keys, one or more of whether at least one of the one or more first keys has been deleted relative to the corresponding one of the one or more second keys, whether at least one of the one or more of first keys has been updated relative to the corresponding one of the one or more second keys, and whether at least one of the one or more second keys has been created between the first time and the second later time.

Example 16. The computing device of example 15, wherein the processing circuitry is, when determining one or more of whether the at least one of the one or more first keys has been deleted relative to the corresponding one of the one or more second keys, whether the at least one of the one or more of first keys has been updated relative to the corresponding one of the one or more second keys, and whether the at least one of the one or more second keys has been created between the first time and the second later time, configured to determine, when the one of the one or more first keys is less than the corresponding one of the one or more second keys, that the one of the one or more first keys is included in the one or more deleted keys.

Example 17. The computing system of any one of examples 15 and 16, wherein the processing circuitry is, when determining one or more of whether the at least one of the one or more first keys has been deleted relative to the corresponding one of the one or more second keys, whether the at least one of the one or more of first keys has been updated relative to the corresponding one of the one or more second keys, and whether the at least one of the one or more second keys has been created between the first time and the second later time, configured to: determine, when the one of one of the one or more first keys is the same as the corresponding one of the one or more second keys, whether a first tree identifier included in the one of the one or more first keys is different from a second tree identifier included in the corresponding one of the one or more second keys; determine, when the first tree identifier is different from the second tree identifier, that the corresponding one of the one or more second keys is associated with updated data that has been updated relative to data associated with the one of the one or more first keys; and determine, when the first tree identifier is not different from the second tree identifier, that the corresponding one of the one or more second keys is associated with unchanged data that has not been changed relative to the data associated with the one of the one or more first keys.

Example 18. The computing system of any one of examples 15-17, wherein the processing circuitry is, when determining one or more of whether the at least one of the one or more first keys has been deleted relative to the corresponding one of the one or more second keys, whether the at least one of the one or more of first keys has been updated relative to the corresponding one of the one or more second keys, and whether the at least one of the one or more second keys has been created between the first time and the second later time, configured to determine, when one of the one or more first keys is greater than the one or more second keys, that the corresponding one of the one or more second keys has been created.

Example 19. The computing system of any one of examples 14-18, wherein the processing circuitry is, when determining that the first child node has changed relative to the second child node, configured to: determine a range of the one or more first keys identified by the first child node that were skipped, where the range identifies the one or more first keys that represent one or more skipped first keys; determine that the one or more skipped first keys are the one or more deleted keys; and advance, based on the range, the first iterator past the one or more skipped first keys.

Example 20. Non-transitory computer-readable storage media having instructions stored thereon that, when executed, cause one or more processors to: identify a first tree data structure corresponding to a first snapshot of at least a first portion of a storage system at a first time; identify a second tree data structure corresponding to a second snapshot of at least a second portion of the storage system at a second later time; traverse the first tree data structure and second tree data structures to identify one or more deleted keys associated with deleted data that has been deleted within at least the portion of the storage system; and perform, based on the one or more deleted keys, a data protection operation.

Although the techniques described in this disclosure are primarily described with respect to a backup or snapshot function performed by a backup manager of a data platform, similar techniques may additionally or alternatively be applied for an archive, replica, or clone function performed by the data platform. In such cases, snapshots 142 would be archives, replicas, or clones, respectively.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method comprising:

identifying, by a data platform implemented by a computing system, a first tree data structure corresponding to a first snapshot of at least a first portion of a storage system at a first time;

identifying, by the data platform, a second tree data structure corresponding to a second snapshot of at least a second portion of the storage system at a second later time;

synchronously traversing, by the data platform, the first tree data structure and the second tree data structure to identify one or more deleted keys indicative of deleted data that has been previously stored by the storage system at the first time and has been deleted from the storage system; and performing, by the data platform and based on the one or more deleted keys, a data protection operation.

2. The method of claim 1, wherein the first tree data structure includes a first root node, one or more first child nodes, and one or more first edges interconnecting the first root node to one or more first child nodes, and wherein the second tree data structure includes a second root node, at least one second child node, and a plurality of second edges interconnecting the second root node to the at least one second child node and to at least one of the one or more first child nodes of the first tree data structure.

3. The method of claim 1, wherein synchronously traversing the first tree data structure and the second tree data structure comprises:

initializing a first iterator to traverse the first tree data structure and a second iterator to traverse the second tree data structure, wherein the first iterator identifies a first root node of the first tree data structure and the second iterator identifies a second root node of the second tree data structure; and synchronously traversing, using the first iterator and the second iterator, the first tree data structure and the second tree data structure to identify the one or more deleted keys indicative of the deleted data previously stored by the storage system at the first time.

4. The method of claim 1, wherein synchronously traversing the first tree data structure and the second tree data structure comprises:

initializing a first iterator to traverse the first tree data structure and a second iterator to traverse the second tree data structure;

advancing the first iterator along a first edge of the first tree data structure from a first parent node of the first tree data structure to identify a first child node of the first parent node;

advancing the second iterator along a second edge of the second tree data structure from a second parent node in the second tree data structure to identify a second child node of the second parent node; and determining whether the second child node has changed relative to the first child node.

5. The method of claim 4, wherein determining whether the first child node has changed relative to the second child node comprises:

determining one or more first keys associated with the first child node, wherein the one or more first keys indicate data stored by at least the first portion of the storage system at the first time;

determining one or more second keys associated with the second child node, wherein the one or more second keys indicate changed data stored by at least the second portion of the storage system that has changed between the first time and the second later time;

advancing each of the first iterator and the second iterator to traverse each of the one or more first keys and the one or more second keys to compare each of the one the one or more first keys to a corresponding one of the one or more second keys;

determining, based on the comparison of each of the one the one or more first keys to the corresponding one of the one or more second keys, one or more of whether at least one of the one or more first keys has been deleted relative to the corresponding one of the one or more second keys, whether at least one of the one or more of first keys has been updated relative to the corresponding one of the one or more second keys, and whether at least one of the one or more second keys has been created between the first time and the second later time.

6. The method of claim 5, wherein determining one or more of whether the at least one of the one or more first keys has been deleted relative to the corresponding one of the one or more second keys, whether the at least one of the one or more of first keys has been updated relative to the corresponding one of the one or more second keys, and whether the at least one of the one or more second keys has been created between the first time and the second later time comprises determining, when the one of the one or more first keys is less than the corresponding one of the one or more second keys, that the one of the one or more first keys is included in the one or more deleted keys.

7. The method of claim 5, wherein determining one or more of whether the at least one of the one or more first keys has been deleted relative to the corresponding one of the one or more second keys, whether the at least one of the one or more of first keys has been updated relative to the corresponding one of the one or more second keys, and whether the at least one of the one or more second keys has been created between the first time and the second later time comprises:

determining, when the one of one of the one or more first keys is the same as the corresponding one of the one or more second keys, whether a first tree identifier included in the one of the one or more first keys is different from a second tree identifier included in the corresponding one of the one or more second keys;

determining, when the first tree identifier is different from the second tree identifier, that the corresponding one of the one or more second keys indicates updated data that has been updated relative to data associated with the one of the one or more first keys; and determining, when the first tree identifier is not different from the second tree identifier, that the corresponding one of the one or more second keys indicates unchanged data that has not been changed relative to the data associated with the one of the one or more first keys.

8. The method of claim 5, wherein determining one or more of whether the at least one of the one or more first keys has been deleted relative to the corresponding one of the one or more second keys, whether the at least one of the one or more of first keys has been updated relative to the corresponding one of the one or more second keys, and whether the at least one of the one or more second keys has been created between the first time and the second later time comprises determining, when one of the one or more first keys is greater than the one or more second keys, that the corresponding one of the one or more second keys has been created.

9. The method of claim 4, wherein determining that the first child node has changed relative to the second child node comprises:

determining a range of one or more first keys identified by the first child node that were skipped, where the range identifies the one or more first keys that indicate one or more skipped first keys;

determining that the one or more skipped first keys are the one or more deleted keys; and advancing, based on the range, the first iterator past the one or more skipped first keys.

10. The method of claim 1, wherein traversing the first tree data structure and the second tree data structure comprises executing respective instances of a depth first search algorithm to synchronously traverse each of the first tree data structure and the second tree data structure.

11. The method of claim 1, wherein the first tree data structure comprises a first B+ tree data structure, and wherein the second tree data structure comprises a second B+ tree data structure.

12. The method of claim 1, wherein one or more of the first snapshot and the second snapshot are stored remote from the data platform in a cloud storage system.

13. A computing system that implements a data platform, the computing system comprising:

a memory configured to store metadata identifying, at least in part, one or more deleted keys representative of deleted data that has been deleted from a storage system; and processing circuitry configured to:

identify a first tree data structure corresponding to a first snapshot of at least a first portion of the storage system at a first time;

identify a second tree data structure corresponding to a second snapshot of at least a second portion of the storage system at a second later time;

synchronously traverse the first tree data structure and second tree data structures to identify the one or more deleted keys indicative of deleted data that has been previously stored by the storage system at the first time and has been deleted from the storage system; and perform, based on the one or more deleted keys, a data protection operation.

14. The computing system of claim 13, wherein to synchronously traverse the first tree data structure and the second tree data structure, the processing circuitry is configured to:

initialize a first iterator to traverse the first tree data structure and a second iterator to traverse the second tree data structure;

advance the first iterator along a first edge of the first tree data structure from a first parent node of the first tree data structure to identify a first child node of the first parent node;

advance the second iterator along a second edge of the second tree data structure from a second parent node in the second tree data structure to identify a second child node of the second parent node; and determine whether the second child node has changed relative to the first child node.

15. The computing system of claim 14, wherein to determine whether the first child node has changed relative to the second child node, the processing circuitry is configured to:

determine one or more first keys associated with the first child node, wherein the one or more first keys indicate data stored by at least the first portion of the storage system at the first time;

determine one or more second keys associated with the second child node, wherein the one or more second keys indicate changed data stored by at least the second portion of the storage system that has changed between the first time and the second later time;

advance each of the first iterator and the second iterator to traverse each of the one or more first keys and the one or more second keys to compare each of the one the one or more first keys to a corresponding one of the one or more second keys;

determine, based on the comparison of each of the one the one or more first keys to the corresponding one of the one or more second keys, one or more of whether at least one of the one or more first keys has been deleted relative to the corresponding one of the one or more second keys, whether at least one of the one or more of first keys has been updated relative to the corresponding one of the one or more second keys, and whether at least one of the one or more second keys has been created between the first time and the second later time.

16. The computing system of claim 15, wherein to determine one or more of whether the at least one of the one or more first keys has been deleted relative to the corresponding one of the one or more second keys, whether the at least one of the one or more of first keys has been updated relative to the corresponding one of the one or more second keys, and whether the at least one of the one or more second keys has been created between the first time and the second later time, the processing circuitry is configured to determine, when the one of the one or more first keys is less than the corresponding one of the one or more second keys, that the one of the one or more first keys is included in the one or more deleted keys.

17. The computing system of claim 15, wherein to determine one or more of whether the at least one of the one or more first keys has been deleted relative to the corresponding one of the one or more second keys, whether the at least one of the one or more of first keys has been updated relative to the corresponding one of the one or more second keys, and whether the at least one of the one or more second keys has been created between the first time and the second later time, the processing circuitry is configured to:

determine, when the one of one of the one or more first keys is the same as the corresponding one of the one or more second keys, whether a first tree identifier included in the one of the one or more first keys is different from a second tree identifier included in the corresponding one of the one or more second keys;

determine, when the first tree identifier is different from the second tree identifier, that the corresponding one of the one or more second keys indicates updated data that has been updated relative to data associated with the one of the one or more first keys; and determine, when the first tree identifier is not different from the second tree identifier, that the corresponding one of the one or more second keys indicates unchanged data that has not been changed relative to the data associated with the one of the one or more first keys.

18. The computing system of claim 15, wherein to determine one or more of whether the at least one of the one or more first keys has been deleted relative to the corresponding one of the one or more second keys, whether the at least one of the one or more of first keys has been updated relative to the corresponding one of the one or more second keys, and whether the at least one of the one or more second keys has been created between the first time and the second later time, the processing circuitry is configured to determine, when one of the one or more first keys is greater than the one or more second keys, that the corresponding one of the one or more second keys has been created.

19. The computing system of claim 14, wherein to determine that the first child node has changed relative to the second child node the processing circuitry is configured to:

determine a range of one or more first keys identified by the first child node that were skipped, where the range identifies the one or more first keys that represent one or more skipped first keys;

determine that the one or more skipped first keys are the one or more deleted keys; and advance, based on the range, the first iterator past the one or more skipped first keys.

20. Non-transitory computer-readable storage media having instructions stored thereon that, when executed, cause one or more processors to:

identify a first tree data structure corresponding to a first snapshot of at least a first portion of a storage system at a first time;

identify a second tree data structure corresponding to a second snapshot of at least a second portion of the storage system at a second later time;

synchronously traverse the first tree data structure and second tree data structures to identify one or more deleted keys indicative of deleted data that has been previously stored by the storage system at the first time and has been deleted from the storage system; and perform, based on the one or more deleted keys, a data protection operation.

* * * * *